United States Patent Office 3,635,913
Patented Jan. 18, 1972

3,635,913
PREPARATION OF POLYAMIDES WITH
ALKALINE CATALYSTS
Karl Heinz Hermann, Krefeld-Bochum, and Hermann Schnell, Krefeld-Urdingen, Germany, assignors to Farbenfabriken Bayer Aktiengesellschaft
No Drawing. Continuation-in-part of abandoned application Ser. No. 444,399, Mar. 31, 1965. This application Oct. 23, 1969, Ser. No. 868,890
Claims priority, application Germany, Apr. 3, 1964, F 42,504
Int. Cl. C08g 20/18
U.S. Cl. 260—78 L    4 Claims

ABSTRACT OF THE DISCLOSURE

Process for preparing polyamides comprising polymerizing an anhydrous lactam in the presence of a catalytic amount of an alkali metal—or alkaline earth metal—C-alkyl lactam, C-cyclo-alkyl lactam, aralkyl lactam or aryl lactam at a temperature of about 100° C., preferbly in the presence of an accelerator selected from the group of organic isocyanates, carbodiimides, cyanamides, N - acyl - lactams, and N - diacyl - amines. The catalyst is preferably initially dissolved in an inert organic solvent and then added to the polymerization system.

RELATED APPLICATION

This application is a continuation-in-part of "Method for the Preparation of Polyamides," Ser. No. 444,399, filed Mar. 31, 1965, now abandoned.

PRIOR ART

It is known to polymerize anhydrous lactams of ω-amino-carboxylic acids anionically in the presence of alkaline catalysts such as alkali or alkaline earth metals or their hydrides, oxides, hydroxides, carbonates, amides or alcoholates at elevated temperatures. The use of alkali metal compounds of caprolactam and pyrrolidone as catalysts is also known.

The speed of polymerization can be increased considerably and/or the polymerization temperature reduced by addition of the usual polymerization accelerators such as isocyanates or compounds which split off isocyanates, carbodiimides or cyanamides, or acid derivatives such as benzoyl chloride and terephthaloyl chloride.

A precondition for the effectiveness of alkaline catalysts is that they should react at least partly with the lactam to form the alkali or alkaline earth compound of the lactam. The course of this reaction depends to a large extent on the basicity of the catalysts, i.e. the catalytic effect decreases with decreasing basicity. Strongly basic catalysts have the disadvantage that they are difficult to handle, partly because they are dangerous, as is the case with alkali metals or hydrides, and partly because of their considerable and rapid uptake of water and carbon dioxide from the atmosphere, which is favored because they are usually crystalline powders having a large surface area. Their catalytic effect may be greatly impaired or even entirely eliminated for this reason.

These disadvantages are partly obviated by using strongly basic catalysts in dissolved form but because of their poor solubility, it is only possible to use solvents such as alcohols or water which interfere with or prevent polymerization and therefore have to be removed again, thus necessitating an additional working step. This also applies to the hitherto used alkali metal or alkaline earth metal compounds of unsubstituted lactams.

THIS INVENTION

It is an object of this invention to provide an improved process for the preparation of polyamides by the polymerization of anhydrous lactams being unsubstituted on their C-atoms using as catalysts alkali metal salts or alkaline earth metal salts of lactams and an accelerator selected from the group consisting of organic isocyanates, carbodiimides, N-acyl-lactams and N-diacyl-amines, at temperatures in the range of from 100–300° C., which improved process overcomes all the above mentioned difficulties.

This object is accomplished by the improvement which comprises effecting polymerization of said lactams being unsubstituted on their C-atoms in the presence of a catalyst selected from the group consisting of alkali metal C-alkyl lactams, alkali metal C-cycloalkyl lactams, alkali metal C-aryl lactams, alkali metal C-aralkyl lactams, alkaline earth metal C-alkyl lactams, alkaline earth metal C-cycloalkyl lactams, alkaline earth metal C-aryl lactams and alkaline earth metal C-aralkyl lactams, dissolved in organic solvents being liquid at room temperature and which do not impair polymerization.

Lactams which can be polymerized according to the invention are those which are not substituted on their C-atoms. Preferably the improvement according to the invention is carried out in the polymerization of the following lactams: Pyrrolidone, piperidone, ε-caprolactam, capryllactam, ω-amino lauric acid lactam or mixtures of these lactams. It is most preferred to polymerize ε-caprolactam.

Examples of alkali metal salts and alkaline earth metal salts of C-substituted lactams to be used according to the invention are the corresponding salts of methyl-, dimethyl-, ethyl-, propyl-, cyclohexyl-, methylcyclohexyl-, benzyl-, phenyl- and tolyl-substitution products of ε-caprolactam and pyrrolidone. Especially suitable are the alkali metal and alkaline earth metal salts of mixtures of isomeric substituted lactams, which are obtained by Beckmann- rearrangement of the 2-, 3- or 4-alklyl- or cycloalkyl cyclohexanone oximes.

The alkali metal and alkaline earth metal salts of the substituted lactams used according to the invention in contrast to the corresponding salts of the unsubstituted lactams, are readily soluble in inert solvents which do not interfere with polymerization and therefore need not be removed.

The catalysts are preferably used in quantities of 0.001 to 10 mol percent, more preferably 0.01 to 1 mol percent, if desired together with the usual quantities of polymerization accelerators.

The catalysts can be prepared from these lactams in the usual manner by reaction with alkali metal or alkaline earth metals or their hydrides, alcoholates or amides in the melt or in a solvent, the gaseous or easily volatile byproducts such as hydrogen, alcohols or ammonia being removed. The lactams can be used in excess in order to achieve, as far as possible, complete reaction. This excess may be up to 200 mol percent or more.

Examples of inert solvents in which the catalysts according to the invention are dissolved are aromatic hydrocarbons, which if desired may be substituted, such as benzene, toluene, xylenes, diethylbenzenes, di(iso) propylbenzenes, anisole and so forth, tetra- and decahydronaphthalene, also N-alkyl-substituted lactams such as N-alkyl-pyrrolidone or caprolactam, and (cyclo)-aliphatic hydrocarbons such as cyclohexane, hexane, heptane and octane, or mixture such as petroleum ether, ligroin and white spirits. It is also possible to use C-substituted lactams themselves as solvents provided that they are liquid at room temperature. In addition, it is also possible to use mixtures of various solvents. The concentrations of the catalyst solutions used can vary within wide limits. The concentrations are preferably between about 1 and 50 percent by weight although higher or lower concentrations are also possible.

As polymerization accelerators the following compounds can be used:

(1) Aliphatic, cycloaliphatic, araliphatic or aromatic mono- or polyisocyanates such as n-butylisocyanate, n-octadecylisocyanate, hexamethylene - 1,6-diisocyanate, cyclohexylisocyanate, phenylisocyanate, and toluylene-diisocyanate-(2,4) also compounds ("adducts") which can split off isocyanates at elevated temperatures, such as the adducts of isocyanates and lactams or phenols.
(2) Carbodiimides such as dicyclohexyl-carbodiimide, diethylcarbodiimide and diphenylcarbodiimide.
(3) Cyanamides such as diethylcyanamide.
(4) N-acyl-lactams such as N - acetyl - pyrrolidone, N-acetyl-caprolactam, and N- benzoyl-caprolactam.
(5) N-diacyl-amines such as tetraacetyl-hexamethylen-diamine.

For polymerization the lactams are mixed with the catalyst solution either at room temperature, and then the accelerator is added at the same or elevated temperature, or the lactams are first mixed with the accelerator and then the catalyst solution is added at room temperature or at elevated temperature. Polymerization is carried out in the usual manner at temperatures of from 100 to 300° C.

EXAMPLES

Example 1

226 g. of ε-caprolactam having a water content of 0.025 percent are melted with exclusion of moisture and heated to 150° C. 4.7 ml. of a 0.86 molar solution of the sodium compound of an isomeric mixture, consisting mainly of γ-methylcaprolactam, dissolved in a mixture of 60 percent m- and 40 percent p-diisopropylbenzene (corresponding to 0.1 mol percent of Na compound) are then added and stirred for a short time; 1.4 ml. of hexamethylene-1:6-diisocyanate (0.4 mol percent) are then added and also stirred. At the end of 2 minutes, the caprolactam is polymerized to a solid, colorless body which has an extract content of 5.3 percent and is no longer soluble in m-cresol.

Example 2

190 g. of ε-caprolactam and 0.7 of octadecyl isocyanate (0.15 mol percent) are melted together and heated to about 160° C. Then 20 g. of ε-caprolactam are distilled off i.v. to remove the traces of moisture. The remaining clear melt is heated with stirring to 200° C. After adding 0.5 ml. of a 3 molar solution of the sodium compound of an isomeric mixture, consisting mainly of γ-methylcaprolactam, dissolved in a mixture of 60 percent m- and 40 percent p-diisopropylbenzene (corresponding to 0.1 mol percent of Na compound) the melt becomes at once (after 20–40 seconds) highly viscous and the temperature of the melt rises to about 270° C. The polymer melt is kept at 270° C. for an hour without stirring.

After cooling, a solid body is obtained which has an extract content of 12.5 percent and a relative viscosity in m-cresol (1 percent solution) of 3.76. The polymer can be processed into fibers, foils, bristles, formed articles etc. by melt-spinning, extrusion or injection moulding.

Example 3

A mixture of 226 g. of caprolactam having a water content of 0.02 percent and of 3.16 g. of the adduct of hexamethylene - 1,6 - diisocyanate and caprolactam are melted with exclusion of moisture and heated to 150° C.

2 ml. of a 2 molar solution of the sodium compound of an isomeric mixture of α- and ε-cyclohexyl-caprolactam dissolved in N-methyl-pyrrolidone (corresponding to 0.2 mol percent of Na compound) are then added and stirred for a short time. At the end of 2 minutes the caprolactam is polymerized to a solid colorless body which has an extract content of 6.0 percent and is no longer soluble in m-cresol.

What we claim is:

1. In a melt polymerization process wherein a lactam free of substitution in its C-atoms is polymerized to a moldable state under anhydrous conditions at 100° to 300° in the presence of a catalyst selected from the group consisting of alkali metal and alkaline earth metal salts of a lactam C-substituted with a solubilizing organic radical, the improvement comprising using as said catalyst an organic solvent soluble salt of said lactam C-substituted with solubilizing organic radical that exists as a mixture of isomers, dissolving said salt of said mixture of isomers in an inert organic solvent liquid at room temperature, and then adding the resulting solution to the reaction mixture of said lactam free of substitution to effect polymerization thereof.

2. The process of claim 1 wherein said organic solvent is selected from the group consisting of aromatic hydrocarbons, aliphatic hydrocarbons, N-alkyl-substituted lactams and mixtures thereof, and an accelerator selected from the group consisting of organic isocyanates, carbodiimides, N-acyl lactams and N-diacyl amines is added to said reaction mixture.

3. The process of claim 1 wherein said lactam free of substitution on its C-atoms is selected from the group consisting of pyrrolidone, piperidone, ε-caprolactam, capryllactam, ω-amino-caproic acid lactam and mixtures thereof.

4. The process according to claim 1, wherein said lactam free of substitution on its C-atoms is ε-caprolactam.

References Cited

UNITED STATES PATENTS

| | | | |
|---|---|---|---|
| 3,061,592 | 10/1962 | Schnell et al. | 260—78 L |
| 3,211,706 | 10/1965 | Borner | 260—78 L |
| 3,216,976 | 11/1965 | Schwartz et al. | 260—78 L |
| 3,234,152 | 2/1966 | Fuller | 260—78 L |
| 3,239,490 | 3/1966 | Gee et al. | 260—78 L |
| 3,298,977 | 1/1967 | Robertson et al. | 260—78 L |

WILLIAM H. SHORT, Primary Examiner

L. M. PHYNES, Assistant Examiner